United States Patent
Krishnaiah et al.

(10) Patent No.: US 10,855,689 B2
(45) Date of Patent: *Dec. 1, 2020

(54) SYSTEM CONFIGURATIONS FOR DATA STREAM ACCESSIBILITY

(71) Applicant: PAYPAL, INC., San Jose, CA (US)

(72) Inventors: Akshay Sanjeevaiah Krishnaiah, San Jose, CA (US); Sandy Lynn Godsey, San Jose, CA (US); Michael Charles Todasco, San Jose, CA (US); Rohan Baddam, San Jose, CA (US); Cheng Tian, San Jose, CA (US); Philip Chuang, San Jose, CA (US); Srivathsan Narasimhan, Saratoga, CA (US)

(73) Assignee: PayPal, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/284,794

(22) Filed: Feb. 25, 2019

(65) Prior Publication Data

US 2019/0260758 A1    Aug. 22, 2019

Related U.S. Application Data

(63) Continuation of application No. 15/252,823, filed on Aug. 31, 2016, now Pat. No. 10,218,710.

(51) Int. Cl.
*H04L 29/06* (2006.01)
*G06Q 30/02* (2012.01)
*G06F 16/951* (2019.01)
*G06F 16/2457* (2019.01)

(52) U.S. Cl.
CPC ...... *H04L 63/105* (2013.01); *G06F 16/24578* (2019.01); *G06F 16/951* (2019.01); *G06Q 30/0267* (2013.01); *H04L 63/10* (2013.01)

(58) Field of Classification Search
CPC ......... G06F 17/30864; G06F 17/30867; H04L 63/105
See application file for complete search history.

(56) References Cited

U.S. PATENT DOCUMENTS

| | | | |
|---|---|---|---|
| 2014/0019240 A1* | 1/2014 | Zhou | G06Q 30/0203 705/14.53 |
| 2014/0330649 A1 | 11/2014 | Lyren et al. | |
| 2015/0026308 A1 | 1/2015 | Mactiernan et al. | |
| 2018/0234427 A1* | 8/2018 | Bapat | G06F 16/9535 |

\* cited by examiner

*Primary Examiner* — Ellen Tran
(74) *Attorney, Agent, or Firm* — Haynes and Boone LLP

(57) ABSTRACT

Obtaining information may be increasingly more challenging in modern times. The systems described herein enable a user to have access to one or more data streams. For example, the data stream may include messages from a famous person provided to an online social networking service, where the messages may be limited character messages. Yet, in some instances, the data stream may also include images posted on a blog, videos posted on a social networking service for connecting people, a list of searches and/or search strings by a famous person, and a number of purchase orders by an actress. The systems may also control the user's access to the one or more data streams, possibly limiting the access to portions of the one or more data streams.

20 Claims, 12 Drawing Sheets

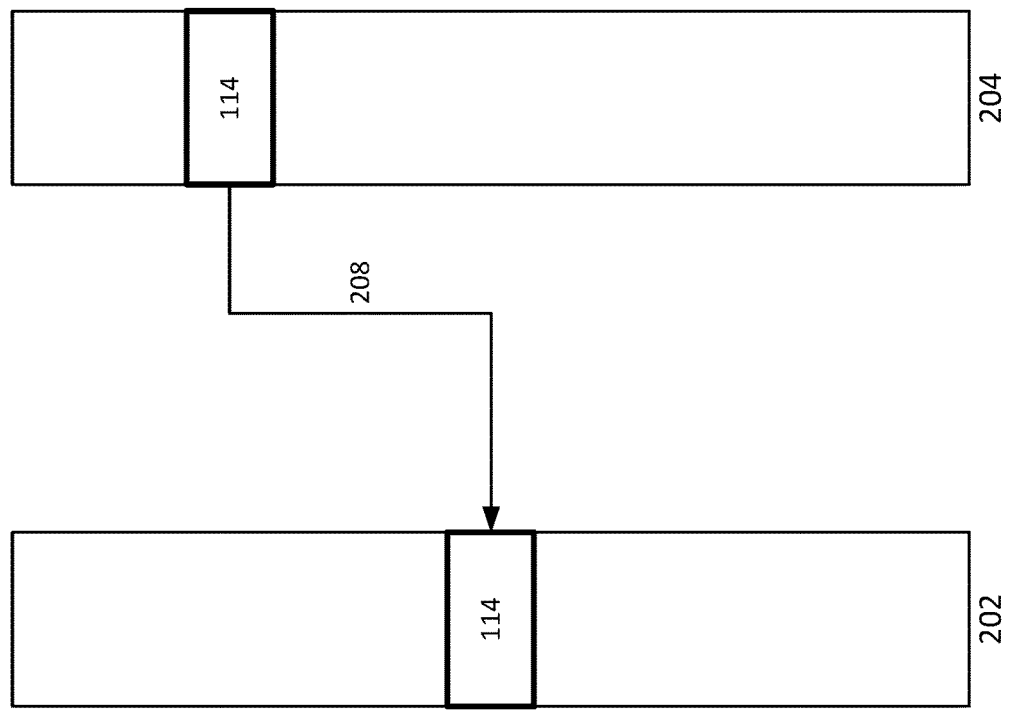

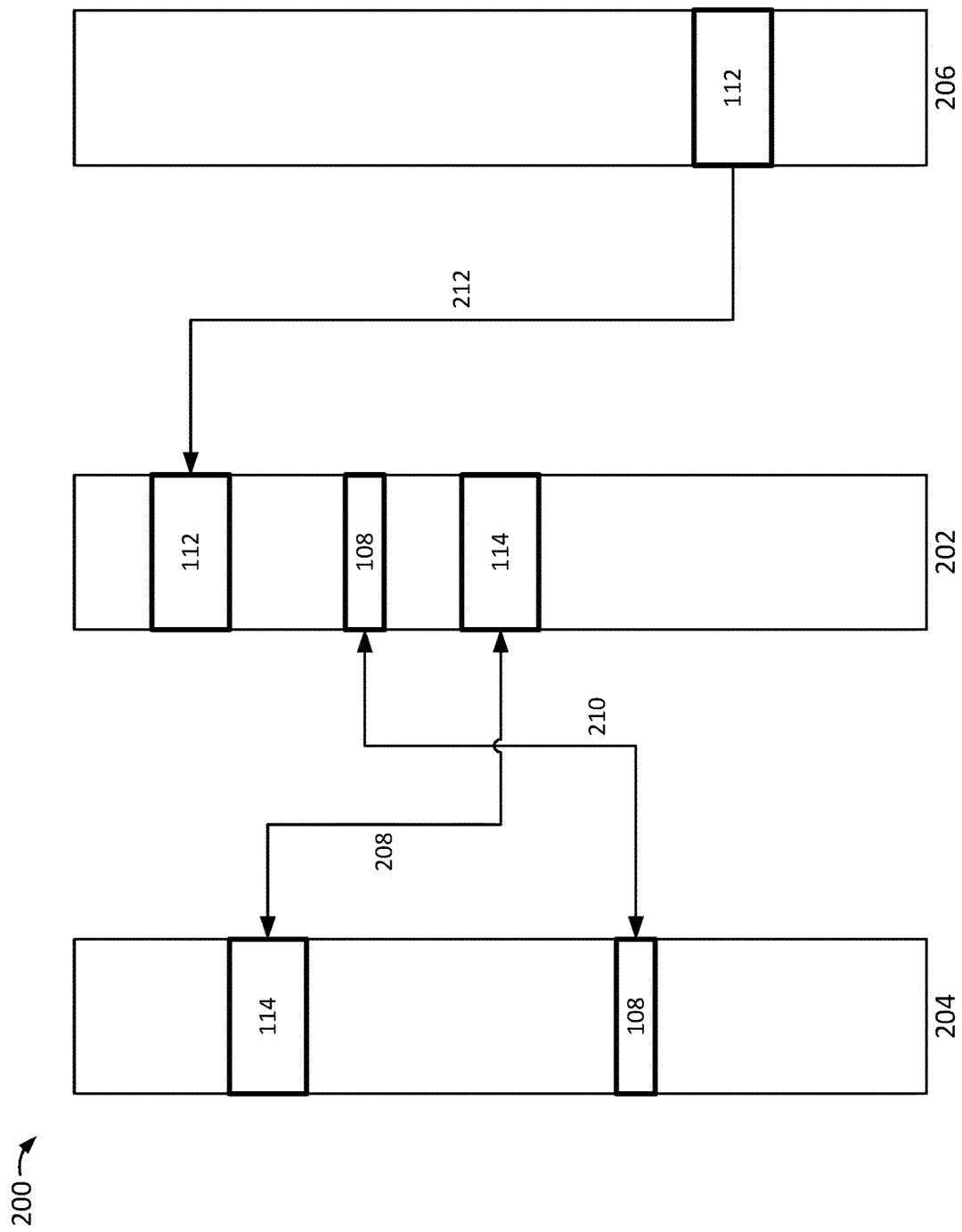

SYSTEM CONFIGURATIONS FOR DATA STREAM ACCESSIBILITY

CROSS-REFERENCE TO RELATED APPLICATIONS

This application is a continuation of U.S. patent application Ser. No. 15/252,823, filed Aug. 31, 2016, which is herein incorporated by reference in its entirety.

BACKGROUND

Obtaining information may be increasingly more challenging in modern times. For example, with the prevalence of various sources of information, a number of obstacles may arise when searching for particular types of information. For example, consider a scenario where a user wishes to obtain information regarding a given electronic device, such as a laptop computer, for instance. In this scenario, the user may face challenges with identifying the right source of the information regarding the laptop computer, such as a source that is less familiar with technology than other sources. In one example, the user may not trust the various sources that provide information regarding the laptop computer, such as recommendations, endorsements, advice, and/or other suggestions regarding the laptop computer. Further, the user may question the accuracy of the information provided by such sources with respect to the laptop computer. As such, the user may research a variety of sources related to the information regarding the laptop computer and waste time determining whether the researched information is credible.

As demonstrated in the scenario above, there may be various inefficiencies associated with obtaining information associated with an item of interest. From a system level perspective, these inefficiencies may be proportionally increased based on the volume of users searching and attempting to obtain information at any given time. As such, there is much need for technological advancements in various aspects of computer technology in the realm of computer networks, and particularly with systems that provide information to numerous users through the Internet.

BRIEF DESCRIPTION OF THE DRAWINGS

FIG. 2A illustrates an example system with a number of data streams, according to an embodiment;

FIG. 2C illustrates an example system with a number of data streams, and a number of data transfers, according to an embodiment;

Figure 1:
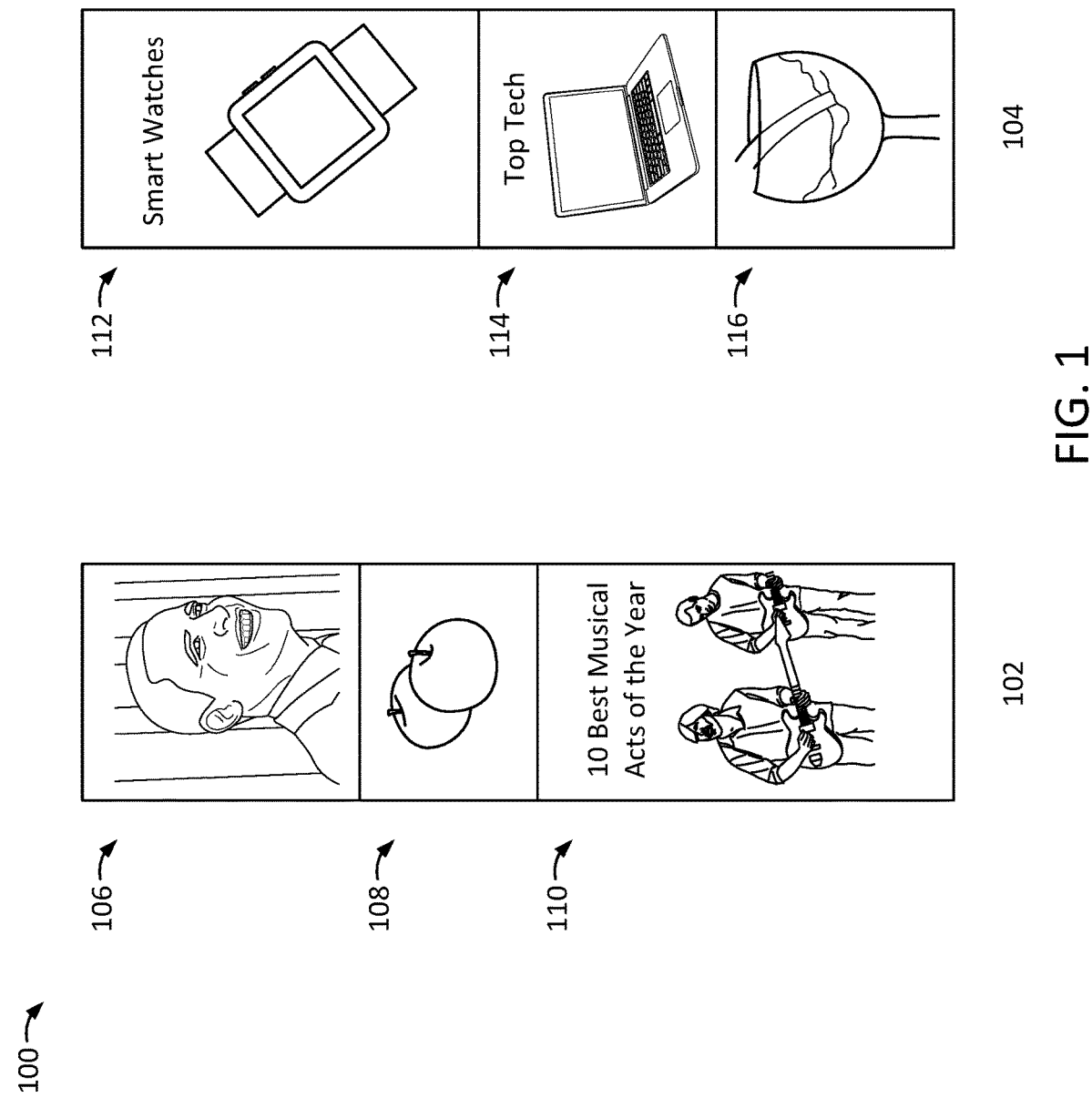
FIG. 1 illustrates an example system with a number of data streams, according to an embodiment.

Embodiments of the present disclosure and their advantages may be understood by referring to the detailed description herein. It should be appreciated that reference numerals may be used to identify various elements and features provided in the figures. The figures may illustrate various examples for purposes of illustration and explanation but are not provided for purposes of any limitation.

DETAILED DESCRIPTION

With respect to the challenges described above associated with obtaining reliable information efficiently, a user may wish to view a data stream. A data stream may be a flow of data and/or data packets from a given source to one or more recipients, where the recipients may include the user that wishes to have access to the data stream. In some instances, the data stream may include a digitally encoded data and/or data packets, possibly including textual data, image data, video data, and/or other forms of multimedia data. For example, the data stream may include messages from a famous person provided to an online social networking service, where the messages may be messages with a limited number of words or characters, possibly referred to as "tweets." Yet, in some instances, the data stream may also include images posted on a fashion blog, videos posted on a social networking service for connecting people, a list of searches and/or search strings by a famous person, a number of purchase orders by an actress or a model, among various other possibilities, including varying degrees of preferences, such as "likes," thumbs up, star-ratings, favorites, wish lists, queues, emotional icons, among other indicators. Further, the data stream may flow into other data streams, potentially creating a combined data stream. Yet, in some instances, the data stream may split into two or more separate data streams, potentially establishing multiple separate data streams that may also combine with other data streams, thereby creating a network of data streams.

In some instances, various users may access a number of data streams, possibly where each data stream incorporates data from the various sources, as described above. For example, a user may set up a personalized data stream that retrieves reliable data from various trusted and/or credible data sources. Consider the scenarios above where the first user is facing challenges with obtaining information associated with electronics. Yet, the first user may know of a second user that is technology savvy and/or well-known to be an expert in the area of electronics, possibly giving rise to the likelihood that the second user has a personalized data stream that retrieves reliable data from various trusted and/or credible sources. Further, in some instances, the various sources may provide the reliable data to the personalized data stream. Thus, the various sources may be the same or different sources as those providing the data and/or content to the first user. As such, the first user may wish to view the data stream or specific content within the data stream associated with the second user that the first user may not have access to in this scenario. For example, the data stream may be one that the second user views regularly, possibly to stay informed regarding various types of electronics. Yet, further, the data stream may include a combination of data from other data streams, possibly customized for the second user. In such instances, the systems described herein may facilitate data transfers and/or control the accessibility of the second user's data stream such that the first user may view the second user's data stream and/or portions of the data stream.

In some embodiments, the systems provider may auto-categorize the data stream based on some canonical, ontological, domain terms, and/or abridged meaningful intent. In some instances, the creator of the data stream may tag the stream and/or the news feed with the various terms above. Yet, in some instances, the system may solicit tags from the audience of the data stream, viewers of the data stream, various social networks associated with the data stream, and further aggregate and/or interpret the tags into the canonical, ontological, domain terms, and/or other abridged meaningful intents represented in the data stream, possibly including the advertising and/or sponsored feedback as merchandising logic built into the data stream.

In some embodiments, a data stream may take various forms. For example, the data stream may take the form of an advertising stream. In particular, the advertising stream may promote, support, and/or provide data regarding a given item, such an electronic item, as contemplated above. Further, the advertisement stream may include various types of information associated with the item, such as a description of the item, buttons to purchase the item referred to as "buy" buttons, specifications associated with the item, and/or other information related to the item, including the availability of the item, possibly indicating the merchants that offer the item, the merchants that have the item in stock, and/or the merchants that offer the item at a discount, among other possibilities. In some instances, the advertisement stream may include textual data, image data, video data, and/or other forms of multimedia data. For example, the various forms of data may provide varying views of the item, such as multiple perspective views of the item, possibly such that the viewers of the advertisement stream may be able to visualize multiple aspects of the item. Further, the data stream may incorporate a number of edited data streams, where each of the edited data streams may be revised, changed, and/or modified based on a given level for editing the content in the data stream. For example, a first data stream may be edited based on a first level of editing to change the content based on user preferences, such as size, shape, and/or formatting. Further, a second data stream may be edited based on a second level of editing to filter out content based on user selections, user inputs, and the like.

As described in the scenarios above, the first user may efficiently obtain information associated with one or more items of interest, thereby alleviating the challenges described above with respect to researching numerous sources and wasting time determining whether the sources are credible and/or trustworthy. Yet further, the systems described herein may enable the first user to view personalized data streams of many other users. For example, the first user may be able to view the data streams viewed by famous persons, other well-known individuals, experts, such as those active in one or more social graphs, corporations associated with sponsored streams, and/or publications. For example, the first user may be a fan of a particular founder of a company and the first user may be interested in one or more data streams that the founder views, possibly on a regular basis. As such, the systems described herein may enable first user to view the data stream regularly viewed by the founder.

In some embodiments, the first user may be able to view the second user's data stream based on an authorization from the second user. For example, for the first user may be required to receive the authorization from the second user before having access to the data stream. Yet, in some instances, the authorization may provide access to portions of the data stream, possibly where the second user is reluctant to share the entire data stream. As such, the systems described herein may filter out other data from the data stream, such that the first user may be restricted from viewing the data that is filtered out of the data stream. Thus, the first user may only have access to the portions of the data stream in which the first user is authorized to view. In some instances, the first user may be required to transfer a fee to the second user to view portions of a data stream and possibly a greater fee to view the entire data stream. In some instances, the fee transferred may vary based on the first user having a subscription level, such as a platinum level, a gold level, and/or a silver level. For example, the fee may be reduced based on the first user having a platinum level as opposed to a silver or a bronze level. In yet other embodiments, authorizations may not be needed for the first user to view content and/or the data stream provided to the second user, such as when that content or data stream is being provided to the second user from a content provider for marketing or informational purposes. For example, the second user may be an expert in automotive repairs, and as such, an auto parts store may provide offers for specific do-it-yourself parts for automobiles, or an auto industry publisher may provide specific stories or articles directed to advancements in auto repairs, which may be purchased by the first user. Where no authorization is needed, an authorization level for access may be a full access level. In some instances, a data stream may be created by a user, a computer, and/or other means such that various restrictions may be placed on the data in the data stream. In some embodiments, the data stream creator establishes a first mode for accessing private information in the data stream, a second mode for accessing public information in the data stream, and/or potentially various other modes to access other information of the data stream. In this way, the creator may have down-stream control over the created material associated with the data stream. For example, such controls may be used by a model who wishes to provide the public with access to her selections for dresses on a photo sharing website, but to restrict the public from having access to her selections for shoes, among other possibilities.

In some embodiments, various connections may be determined between the first user and the second user. In some instances, the first user and the second user may have accounts with a number of providers, possibly the same providers. For example, the first user may have an account, possibly referred to as a first user account, with a given service provider. Further, the second user may also have an account, possibly referred to as a second user account, with the given service provider. In such instances, the second user may authorize the first user to view portions of the data stream described above based on one or more connections between the first user account and the second user account.

Notably, the connections may be maintained by the service or content provider, possibly a newscast service provider, a social networking provider, a music streaming service provider, a podcast service provider, a video streaming service provider, a commerce or marketplace provider, and/or a payment provider, such as PayPal, Inc. of San Jose, Calif., USA. Thus, the first user's access to the data stream may vary based on the number of connections between the first user account and the second user account. Further, the first user's access to the data stream may be specific to one or more types of data based on the number of connections between the first user account and the second user account.

It should also be noted that the data streams described herein are not limited to one or more types of data. For instance, one example data stream may include numerous types of data including newscast data, social networking data, music play list data, podcast episode data, video streaming data, and/or other forms of online multimedia data, among other possibilities. In some instances, users may gain access to links, such as hyperlinks to articles, links to networks of other users, offers for products, online sources, electronic documents, pictures and/or digital images, and/or other forms of accessible data.

FIG. 1 illustrates an example system 100 with a number of data streams 102 and/or 104, according to an embodiment. For example, consider a scenario where a first user has access to the data stream 102, possibly such that the data stream 102 is created by the first user. As shown, the data stream 102 may include the data 106, potentially including an article associated with a political figure. Further, the data stream 102 may include the data 108, possibly including an article associated with healthy foods. Yet further, the data stream 102 may include the data 110, possibly including an article associated with music, where the article is entitled, "10 Best Musical Acts of the Year."

As noted in the scenarios above, the first user may be facing challenges with obtaining information related to electronics. Yet, the first user may know of the second user, such as the well-known expert described above. In some instances, the second user may simply be a technology savvy individual. Yet further, the second user may simply be a trusted and/or credible individual. As such, the first user may wish to view the data stream 104 associated with the second user. As shown, the data stream 104 may include the data 112, possibly including an article associated with electronics, such as smart watches, where the article is entitled, "Smart Watches." Further, the data stream 104 may include the data 114, possibly including an article associated with electronics, such as an article associated with laptop computers, where the article is entitled, "Top Tech," or "Top Technology for Consumers." Yet further, the data stream 104 may include the data 116, possibly including an article associated with beverages.

In some embodiments, the first user may be able to view the data stream 104, possibly based on an authorization from the second user to enable the first user to view the data stream 104. In some instances, the first user may be required to receive the authorization from the second user before having access to the data stream 104. Notably, the data stream 104 may include data 112 and/or 114 associated with electronics and other types of data 116 as well. As such, the authorization may provide access to portions of the data stream 104. In particular, the system 100 may filter out the other data 116 from the data stream 104, such that the first user may be restricted from viewing the filtered data 116. Thus, the first user may only have access to the data 112 and/or 114 of the data stream 104. In some instances, the first user may be required to transfer a fee to the second user to view the data 112 and/or 114 of the data stream 104 and a greater fee to view the data 112, 114, and/or 116 of the data stream 104.

FIG. 2A illustrates an example system 200 with a number of data streams 202 and 204, according to an embodiment. For example, the data streams 202 and/or 204 may take the form of the data streams 102 and/or 104, respectively, described above in relation to FIG. 1. Further, the data 114 shown in FIG. 2A may take the form of the data 114 shown in FIG. 1. In some instances, the system 200 may receive a request from a first user for one or more types of data, such as the data associated with electronics, as discussed above. In some instances, the received request may identify the second user associated with the one or more types of data. For example, the received request may include an identifier of the second user, such as a first name and/or a last name, a username associated with the second user account, an email address, a telephone number, among other types of data associated with the second user. Further, the system 200 may search the one or more data streams 204 associated with the second user based on the request for the one or more types of data. Yet further, the system 200 may identify data 114 from the one or more data streams 204 that corresponds to the one or more types of requested data based on searching the one or more data streams 204.

In some embodiments, the system 200 may determine an authorization from the second user to transfer 208 the identified data 114 from the one or more data streams 204 to the first user, such as the first user account and/or to the first user's data stream 202, as shown. Further, the system 200 may transfer 208 the identified data 114 from the one or more data streams 204 to the first user based on the authorization from the second user. Notably, the system 200 may include a non-transitory memory and one or more hardware processors coupled to the non-transitory memory, as described further herein. Further, the processors may be configured to read instructions from the non-transitory memory to cause the system to perform operations the various operations described herein.

In some embodiments, the system 200 may determine the authorization from the second user provides the first user with access to the one or more data streams 204. For example, the first user may have full access to the data stream 204, including the data 114 described above. Thus, the first user may be authorized to access other data from the one or more data streams 204 based on the authorization from the second user. In some instances, the data streams 204 may be incorporated in the first user's data stream 202 based on the authorization from the second user, possibly combining the data streams 202 and 204. In particular, the first user may provide the second user with an additional fee to incorporate the data stream 204 with the first user's data stream 202.

In some embodiments, the transferred data 114 includes advertisement data from the one or more data streams 204 associated with the second user. In particular, the one or more data streams 204 may include an advertisement data stream, as described above. For example, considering the scenarios above, the advertisement data may provide information regarding one or more laptop computers available to the first user. As such, the system 200 may cause a mobile device associated with the first user, such as the first user's smartphone, to display the advertisement data. Further, the mobile device may allow the first user to purchase a laptop computer advertised with the transferred data 114. Notably, the transferred data 114 may also include preferences overlaid over the advertisement data, such as hearts, likes, thumbs up, sand/or stars, among other graphical data.

In some embodiments, the system 200 may identify an account of the first user, possibly referred to as the first user account described above. Further, the system 200 may identify an account of the second user, possibly referred to as the second user account described above. For example, the first user account and the second user account may be associated with one or more service providers. As such, in some instances, the system 200 may determine and/or detect the first user's authentication to log in to the first user account, where the received request for the one or more types of data may be initiated from the first user account. Further, the system 200 may identify the second user account based on the first user account associated with the received request. As contemplated above, for example, the first user account and the second user account may be maintained by the same service provider, where the second user account may include the one or more data streams 204. Thus, in some instances, the data from 114 may be identified from the one or more data streams 204 based on identifying the second account maintained by the service provider.

In some embodiments, the system 200 may determine and/or identify the first user account associated with the received request for the one or more types of data. For example, the system 200 may identify the first user's username, email address, and/or telephone number associated with the first user account from the received request. As such, the system 200 may determine the first user account corresponds to the second user account based on one or more connections of a social networking graph. For example, the system 200 may determine that the first user account is directly or indirectly linked to the second user account in the social networking graph. As such, the data 114 may be identified from the one or more data streams 204 based on the first user account corresponding to the second user account in the social networking graph.

Figure 2B:
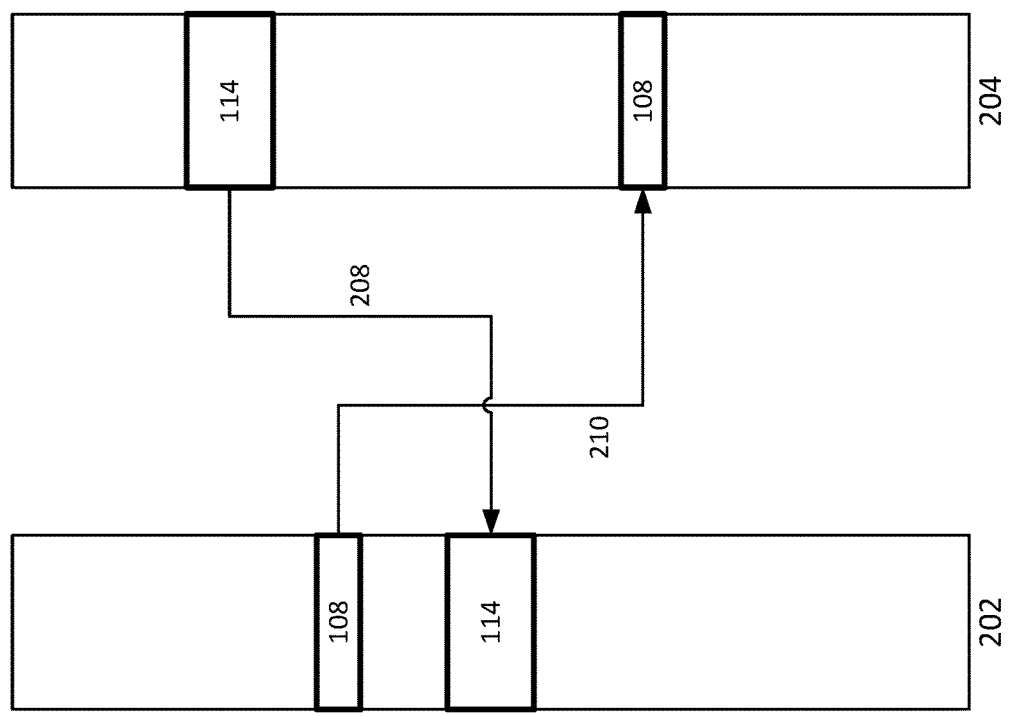
FIG. 2B illustrates an example system with a number of data streams, and a number of data transfers, according to an embodiment.

FIG. 2B illustrates an example system 200 with a number of data streams 202 and/or 204, and a number of data transfers 208 and/or 210, according to an embodiment. Further, the data 108 and/or 114 shown in FIG. 2B may take the form of the data 108 and/or 114 shown in FIG. 1. In some instances, the system 200 may perform one or more data exchanges with the data streams 202 and/or 204. For example, based on the system 200 receiving the initial request from the first user for the data 114, the system 200 may provide the second user with an indication of data available from the first user's data stream 202. In some instances, the indication may provide clips and/or previews of the data available from the data stream 202.

In some embodiments, the system 200 may receive a second request from one or more other users for the first user's data 108 from the data stream 202, possibly accessible from the first user's device and/or smartphone. For instance, the system 200 may receive the second request from the second user, where the second request may indicate a request for the first user data 108 associated with the data stream 202. In some instances, the system 200 may exchange the identified data 114 from the data stream 204 for the first user data 108 from the data stream 202. As shown, for example, the system 200 may transfer 208 the data 114 in exchange for the transfer 210 of the data 108. In some instances, the first user may obtain her access to the data 114 from the second user's data stream 204 in response to transferring 210 the data 108 to the second user's data stream 204.

FIG. 2C illustrates an example system 200 with a number of data streams 202, 204, and/or 206, and a number of data transfers 208, 210, and/or 212, according to an embodiment.

As shown, the data stream 202 described above is illustrated between the data stream 204 and 206, and thus, the data stream 204 now appears to the left side of the data stream 202. Further, as described above, the data 108, 112, and/or 114 shown in FIG. 2C may take the form of the data 108, 112, and/or 114 shown in FIG. 1. As noted, the first user described above may access data 114 from the second user, particularly from the data stream 204. Yet, further, the first user may also access data 112 from a third data stream 206 associated with a third user.

For example, the system 200 may identify the third data 112 from the third data stream 206 associated with a third user. Further, the system 200 may identify that the third data 112 corresponds to the one or more types of data requested by the first user. For example, the third data 112 may include data associated with other types of electronics, such as the smart watches described above. As such, the system 200 may determine whether a user authorization from the third user is needed to transfer 212 the third data 112 from the third data stream 206 to the data stream 202, possibly to provide the access to the first user's device. In some embodiments, the system 200 may cause the first user device to display the third data 112 from the third data stream 206 based on determining whether the user authorization from the third user is needed.

In some embodiments, the system 200 may determine and/or identify one or more indications of the second user associated with the data streams 204 and 206. For example, consider a scenario where the second user indicates that the second user approves, endorses supports, agrees, and/or likes one or more advertisements provided by the data 112 and/or 114, possibly where the data 112 and/or 114 are retrieved from advertisement streams, as described above. As such, the system 200 may determine and/or identify the second user indications from the one or more data streams 204 and/or 206, possibly where the second user indications correspond to the one or more types of data requested by the first user, such as the laptop data and/or information regarding the quality of laptops. For example, the second user indications may be linked to one or more laptop computers identified in the data requested by the first user. As such, the system 200 may determine the data 112 and/or 114 corresponds to the one or more types of data requested by the first user. In particular, the system 200 may determine the data 112 and/or 114 is related to the one or more types of data requested based on the one or more second user indications identified. In some instances, the data 112 and/or 114 may be transferred to the first user based on the system 200 determining the data 112 and/or 114 corresponds and/or is related to the one or more types of requested data.

In some embodiments, the system 200 may communicate with the second user without revealing the identity of the first user. For example, the system 200 may transmit an anonymous request to the second user to transfer 208 the identified data 114 from the one or more data streams 204 to one or more anonymous users, where the one or more anonymous users includes the first user described above. As such, the authorization from the second user to transfer 208 the identified data 114 may be determined from the anonymous request to the second user. As such, the authorization from the second user may be determined without identifying the first user to the second user. Thus, the system 200 may resolve any privacy issues and/or concerns associated with the first user and/or the second user.

Figure 2D:
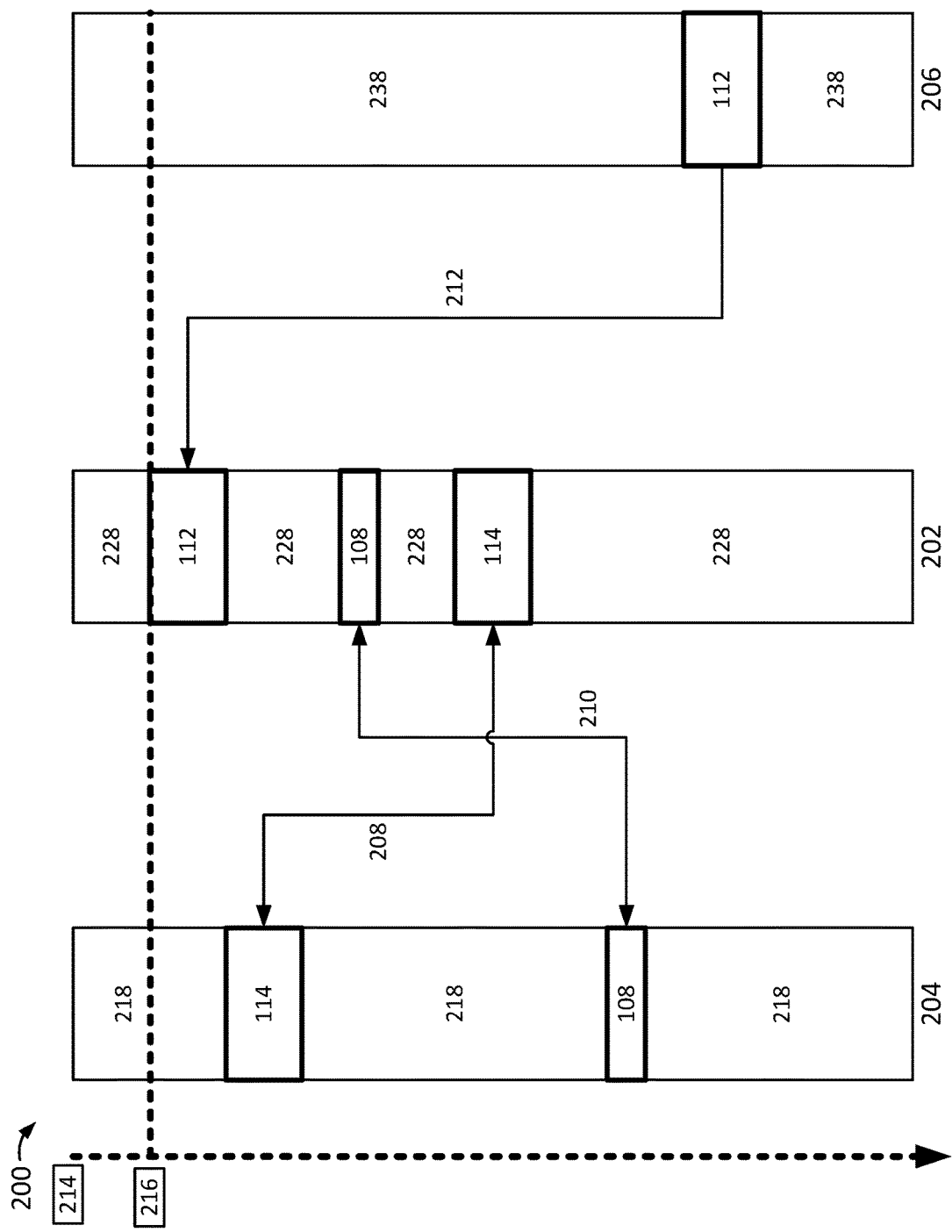
FIG. 2D illustrates an example system with a number of data streams associated with a timeline, according to an embodiment.

FIG. 2D illustrates an example system 200 with a number of data streams 202, 204, and/or 206 associated with a timeline 214, according to an embodiment. Further, as described above, the data 108, 112, and/or 114 shown in FIG. 2D may take the form of the data 108, 112, and/or 114 shown in FIG. 1. As noted, the system 200 may transfer 208 the data 114 from the data stream 204 to the data stream 202. Further, the system 200 may transfer 210 the data 108 from the data stream 202 to the data stream 204. Yet further, the system 200 may transfer 212 the data 112 from the data stream 206 to the data stream 202. In addition, the system 200 may not provide the first user with access to other data 218 from the data stream 204 and the other data 238 from the data stream 206. Further, the system 200 may not provide the second user and the third user with accesses to the other data 228 from the data stream 202.

In some embodiments, the system 200 may provide the first user with access to the data 112 before the third user has access to the data 112. In particular, the system 200 may provide the first user with access to the data 112 before it appears in the third user's data stream 206. For example, the system 200 may identify a time 216 shown on the timeline 214, where the time starts at the top of the timeline 214 and continues down the timeline 214 as time passes. In particular, the time 216 may be associated with the received request, possibly indicating a time when the request is received by the system 200. Further, the third data 112 may not be viewable from the third data stream 206 at the identified time 216. Yet, the system 200 may receive a user authorization from the third user to allow the first user to access the data 112 which may not be viewable from the third data stream 206 at the identified time 216. In particular, the user authorization from the third user may be based on a fee the third user receives from the first user to provide the first user with the early access to the data 112. As such, the system 200 may determine the user authorization from the third user even though the third data 112 is not viewable from the third data stream 206 at the identified time 216. Further, the system 200 may cause a mobile device of the first user to display the third data 112 from the third data stream 206 based on the user authorization from the third user. Notably, the mobile device of the first user may display the third data 112 at the time 216, possibly displaying the data 112 in other positions in the data stream 202 at or after the time 216.

In some embodiments, the system 200 may filter, screen, and/or scrape the data 218, 228, and/or 238 from the transfers 208, 210, and/or 212, among other possible data transfers contemplated herein. For example, the system 200 may filter the other data 218, 228, and/or 238 from the one or more data streams 204, 202, and/or 206, respectively, possibly based on the one or more types of requested data by the users. For example, the data 218 may not have a relationship to the type of data requested. As such, the system 200 may filter the data 218 away from the transfer 208 of the data 114 from the data stream 204 to the data stream 202. As noted, the data 114 that corresponds to the one or more types of data may be identified from the one or more data streams 204. Yet, in these scenarios, the data 114 may be identified based on filtering the other data 218 from the one or more data streams 218, possibly based on media type, songs, and/or videos.

In some embodiments, the data streams 102, 104, 202, 204, and/or 206 described above in relation to FIGS. 1-2D may include one or more data feeds. For example, the data streams 102, 104, and 202-206 may take the form of one or more data feeds, possibly referred to as data feeds 102, 104, 202, 204, and/or 206. In some instances, the data feeds 102-104 and 202-206 may be received by the various users described above from one or more data sources. In some instances, the data feeds 102-104 and 202-206 may include updated data 106-116 and/or 218-238 from the data sources, where the data 106-116 and/or 218-238 may be updated in real-time. In some instances, the systems 100 and/or 200 may control accesses to the updated data 106-116, 218, 228, and/or 238 from the data feeds 102-104 and 202-206, possibly based on user profiles, interests, and/or preferences, among other factors. For example, considering the scenarios above, the transferred data 114 may be updated with additional data. In such instances, the systems 100 and/or 200 may provide the first user with access to the updated data 114 based on an authorization from the second user to provide the first user with access to the updated data 114, possibly in exchange for an additional fee.

It should be noted that the systems 100 and/or 200 may receive the request for one or more types of data from a user device, such as the first user's device, e.g., a smartphone. The systems 100 and/or 200 may search for one or more data feeds 104, 204, and/or 206 associated with one or more other users based on the request for the one or more types of data. Further, the systems 100 and/or 200 may also identify data 112 and/or 114 from the one or more data feeds 104, 204, and/or 206 that corresponds to the one or more types of the data requested by the first user, possibly based on the search performed with the one or more data feeds 104, 204, and/or 206. The systems 100 and/or 200 may also determine whether an authorization from the one or more other users is needed to transfer 208 and/or 212 the identified data 114 and/or 112 from the one or more data feeds 204 and/or 206 to the user device. The systems 100 and/or 200 may also cause the first user device to display the identified data 114 and/or 112 from the one or more data feeds 204 and/or 206 based on the determining whether the authorization is needed from the one or more other users. In some instances, the systems 100 and/or 200 may include a non-transitory computer-readable medium having stored thereon machine-readable instructions executable to cause a machine to perform the operations described herein.

In some instances, the systems 100 and/or 200 may also filter the other data 218, 228, and/or 238 from the one or more data feeds 204, 202, and/or 206, respectively. For example, the other data 218, 228, and/or 238 may be filtered from the data transfers 208, 210, and/or 212 based on the one or more types of data requested by the first user. For example, the other data 218, 228, and/or 238 may be filtered out from the data transfers 208, 210, and/or 212, based on the other data 218, 228, and/or 238 lacking relationships, links, associations, and/or overlapping descriptions with data requested. As such, the filtered data 218 and/or 238 may not correspond to the one or more types of data requested by the first user. Further, the data 112 and/or 114 that correspond to the one or more types of data requested by the first user may be identified from the one or more data feeds 206 and/or 204, respectively, based on filtering the other data 238 and/or 218 from the one or more data feeds 206 and/or 204.

Figure 3:
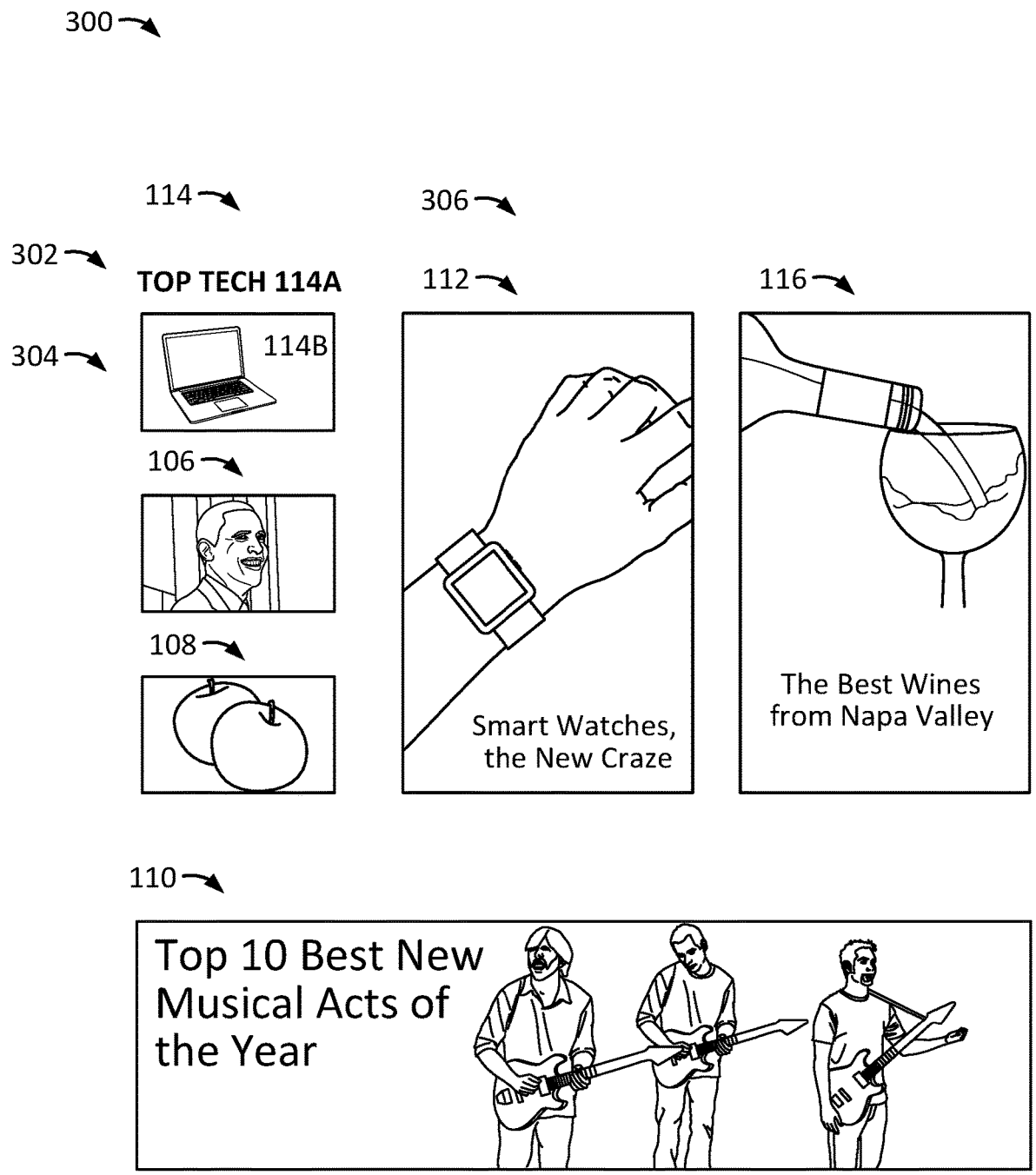
FIG. 3 illustrates an example system with various forms of data, according to an embodiment.

FIG. 3 illustrates an example system 300 with various forms of the data 106, 108, 110, 112, 114, and/or 116, according to an embodiment. The system 300 may take the form of the systems 100 and/or 200 described above in relation to FIG. 1-2D, among other systems described herein. In some instances, the data 106, 108, 110, 112, 114, and/or 116 shown in FIG. 3 may take the form of the data 106, 108, 110, 112, 114, and/or 116 shown in FIGS. 1-2D.

In some embodiments, the system 300 may arrange the data 106, 108, 110, 112, 114, and/or 116 for a particular user, possibly for a user account, as shown in FIG. 3. For example, the system 300 may retrieve the data 106, 108, 110, 112, 114, and/or 116 from the data feeds 102, 104, 202, 204, and/or 206, among other possible data feeds and/or data streams described herein. In some instances, for example, the identified data 114 from the one or more data feeds 104 and/or 204 may include first data 114A and second data 114B. As shown, the first data 114A may include textual data that shows, "TOP TECH" or "TOP TECHNOLOGY," possibly in bold and capitalized letters. Further, the second data 114B may include graphical data that provides an image of a laptop computer that the system 300 identifies the first user may be interested in.

In some embodiments, the system 300 may determine a first position 302 of the first data 114A, possibly on the first user's account displayed by the first user device. In some instances, the position 302 may be determined based on the first data 114A, such as the textual data that indicates, "Top Tech," where the textual data may correspond to the request for the one or more types of data. Further, the system 300 may determine a second position 304 of the second data 114B on the user account displayed by the first user device based on the second data 114B, such as the graphical data of the laptop computer, where the graphical data may also correspond to the request for the one or more types of data. Notably, the first position 302 and the second position 304 may be determined in accordance with the position 306 of the data 112. In particular, the first position 302 may be on the top left to capture the first user's attention.

In some embodiments, the system 300 may format the data 106, 108, 110, 112, 114, and/or 116 from the data feeds 102, 104, and/or 202-206, among other possible data feeds and/or data streams described herein. As noted, for example, the identified data 114 from the one or more data feeds 104 and/or 204 may include first data 114A and second data 114B. In such instances, the request for the one or more types of data from the first user may indicate one or more requested formats of the data 114A. In some instances, the system 300 may format the first data 114A, such as the textual data, such that the formatted first data 114A may be displayed on the first user device, possibly in bold, underlined, capitalized, and/or highlighted letters.

In some instances, the system 300 may format the first data 114A based on the first data 114A corresponding to the request for the one or more types of data. As such, the first data 114A may be formatted based on the one or more requested formats, such that the formatted first data 114A may be displayed by the first user device. Further, the system 300 may format the second data 114B, such that the formatted second data 114B may be displayed by the first user device. As such, the formatted second data 114B may be displayed with the formatted first data 114A based on the second data 114B corresponding to the request for the one or more types of data, as described above. For example, the first user may request images of various laptops recommended by the second user. As such, the graphic data from the second data 114B may be provided in response to the request.

Figure 4:
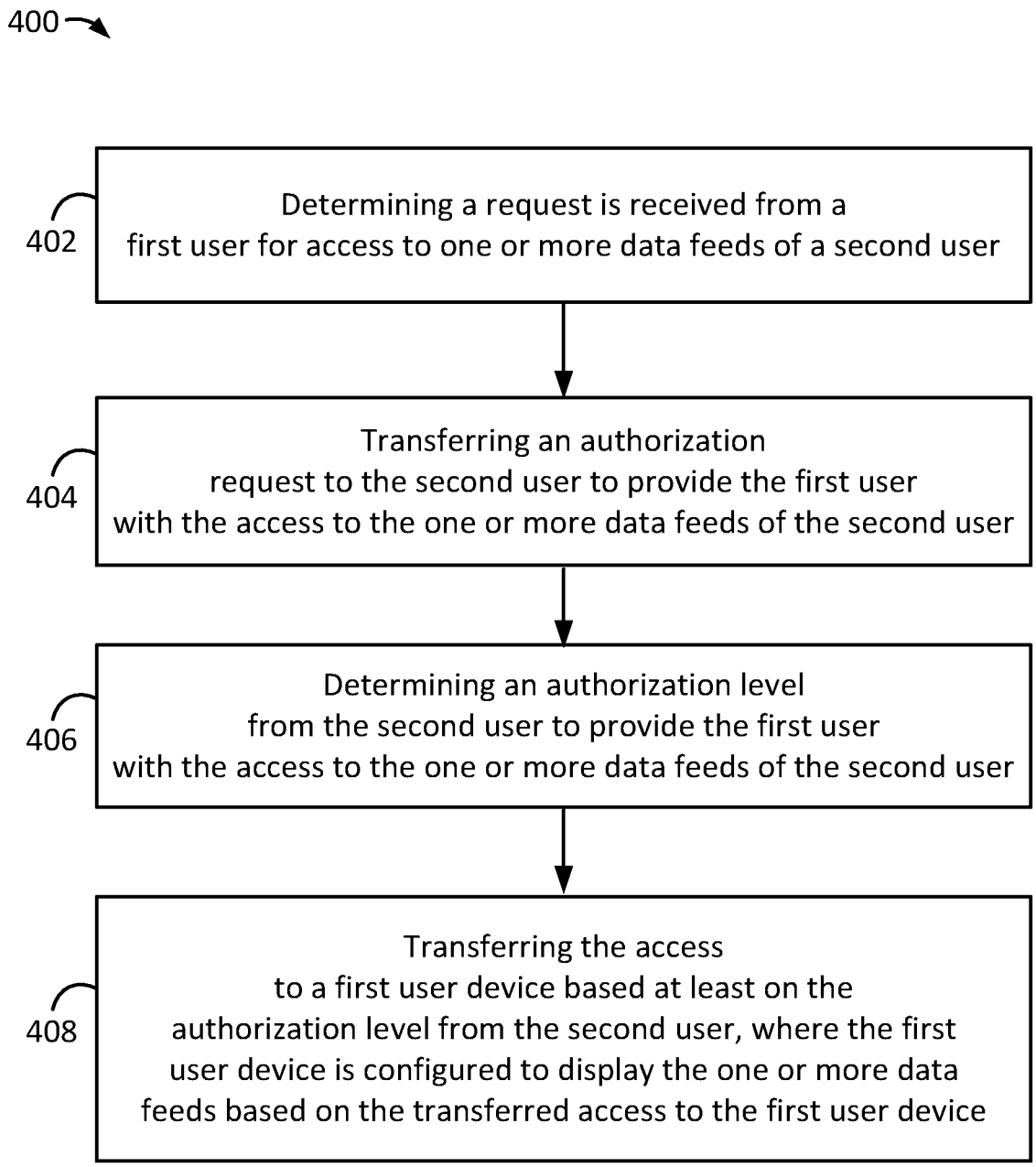
FIG. 4 is a flowchart of an exemplary method, according to an embodiment.

FIG. 4 illustrates an exemplary method 400, according to an embodiment. The method 400 may be performed by the system 100, 200, and/or 300, among other possible devices, systems, and/or combinations of such devices and/or systems described herein. Notably, one or more steps of the method 400 described herein may be omitted, performed in a different sequence, and/or combined with other methods for various types of applications contemplated herein, such as routing and/or shipping applications.

At step 402, the method 400 may include determining a request is received from a first user for access to one or more data feeds of a second user. For example, the request may be received from the first user to access the data feeds 104, 204, and/or 206. Further, the request may be received from the first user to access the data 112, 114, and/or 116 from the data feeds 104, 204, and/or 206.

At step 404, the method 400 may include transferring an authorization request to the second user to provide the first user with the access to the one or more data feeds of the second user. In some instances, the authorization request may be transferred to the second user such that the first user may access the data feeds 104, 204, and/or 206, possibly including one or more portions of the data 112, 114, and/or 116 from the data feeds 104, 204, and/or 206.

At step 406, the method 400 may include determining an authorization level from the second user to provide the first user with the access to the one or more data feeds of the second user. In some instances, the second user authorization may provide the first user with access to the data feeds 104, 204, and/or 206, possibly including one or more portions of the data 112, 114, and/or 116 of the data feeds 104, 204, and/or 206.

At step 408, the method 400 may include transferring the access to a first user device based on the authorization level from the second user, where the first user device is configured to display the one or more data feeds based on the transferred access to the first user device. In some instances, the access may be transferred to the first user device such that the first user device is enabled to display the one or more data feeds 104, 204, and/or 206, possibly including one or more portions of the data 112, 114, and/or 116 of the data feeds 104, 204, and/or 206.

Figure 5:
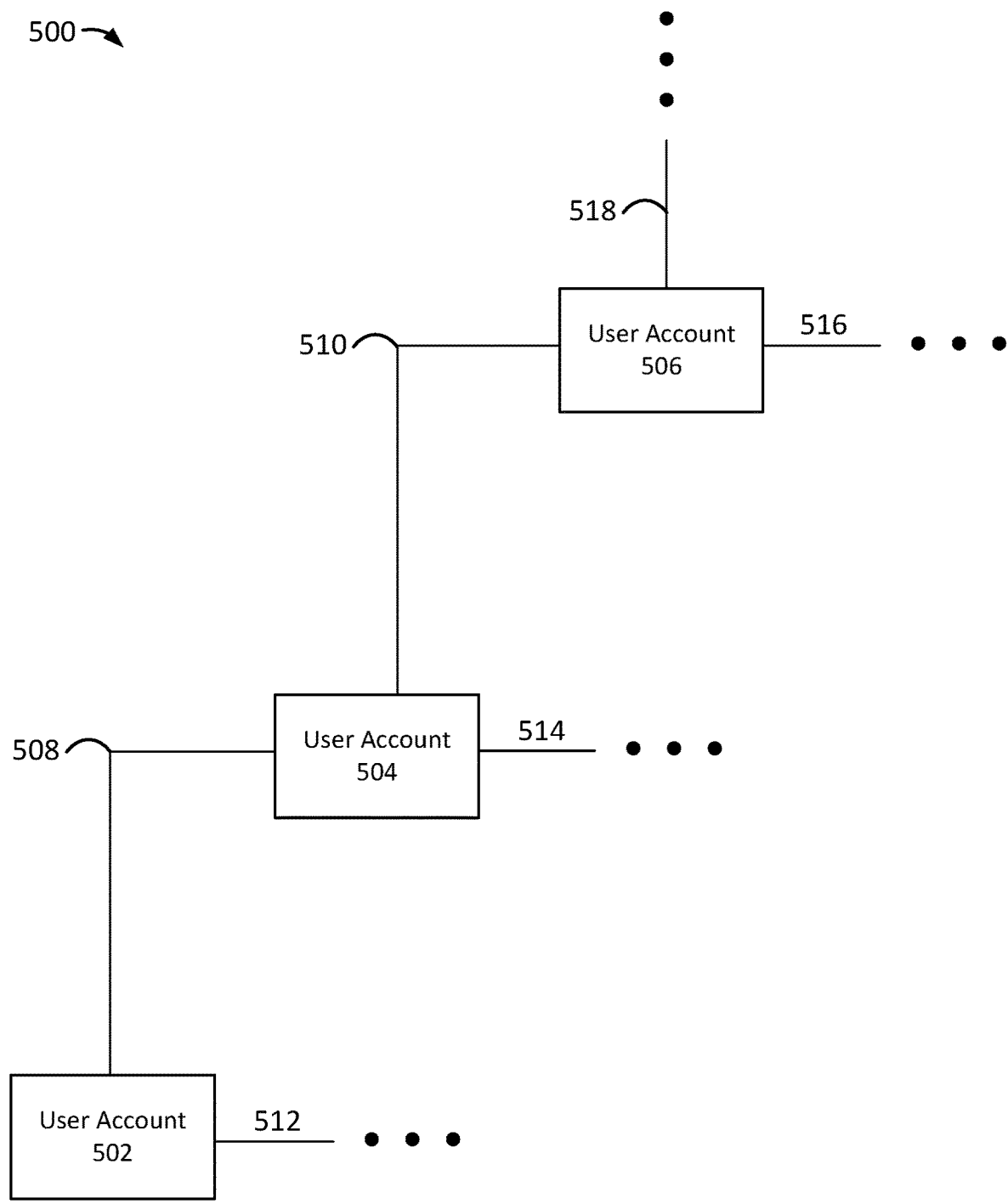
FIG. 5 illustrates a social network graph, according to an embodiment.

FIG. 5 illustrates a social network graph 500, according to an embodiment. As shown, the social network graph 500 includes a number of user accounts 502, 504, and/or 506. For example, the user account 502 may be the first user's account, the user account 504 may be the second user's account, and the user account 504 may be the third user's account described in the scenarios above. Further, as shown, a link 508 is provided between the first user account 502 and the second user account 504. Yet further, a link 510 is provided between the second user account 504 and the third user account 506. In some instances, the links 508 and/or 510 may indicate relationships, associations, and/or other common connections between the accounts 502, 504, and/or 506. Notably, the user account 502 may have other links 512 to other accounts, the user account 504 may have other links 514 to other accounts, and the user account 506 may have other links 516 and 518 to other accounts in the social network graph 500, as represented with the ellipses.

In some embodiments, users may be authorized to access the data feeds 102, 104, 202, 204, and/or 206 based on the links 508, 510, 512, 514, 516, and/or 518, among the other links contemplated in the social network graph 500. For example, referring back to the method 400 described above, the method 400 may include determining the one or more links 508 associated with the first user account 502 and the second user account 504 in the social network graph 500. In some instances, the first user may be logged into their account 502. In particular, the first user may be authenticated to view the first user account 502 on the first user's device.

As noted, an authorization request may be transferred to the second user account 504 and authorization may be provided such that the first user account 502 may have access to the data streams 104 and/or 204, possibly including one or more portions of the data 112, 114, and/or 116. In some instances, the authorization request transferred to the second user account 504 may indicate the one or more determined links 508 associated with the first user account 502 and the second user account 504. As such, the authorization level for the first user account 502 to access one or more portions of the data 112, 114, and/or 116 may be determined based on the authorization request that indicates the one or more determined links 508. For example, the second user may view the links 508 associated with the first user account 502 and the second user account 504 and provide the authorization for the first user account 502 to access one or more portions of the data 112, 114, and/or 116.

In some embodiments, users may be authorized to access the data feeds 102, 104, 202, 204, and/or 206 based on the other links 510, 512, 514, 516, and/or 518, among the various other links contemplated in the social network graph 500. For example, the method 400 may include determining one or more links 508, 510, and/or 518 associated with a third user account 506. In some instance, the third user account 506 may be linked to the first user account 502 and the second user account 504, possibly based on the links 508 and 510. In particular, the second user account 504 may be linked with the third user account 506 with the link 510, and the first account 502 may be linked with the second user account 504 with the link 508.

In one example, the first user account 502 may be linked with the third user account 506 with the links 508 and/or 510, and possibly also with the links 512, 514, and/or 516. In some instances, the authorization request transferred to the second user account 504 may indicate the one or more determined links 508 and/or 510, and possibly with the links 512, 514, and/or 516, associated with the third user account 506. As such, the authorization level for the first user account 502 to access one or more portions of the data 112, 114, and/or 116 may be determined based on the authorization request that indicates the one or more determined links 508 and/or 510, and possibly with the links 512, 514, and/or 516, such as in instances where the second user authorizes the access.

It should be noted that the first user account 502, the second user account 504, and/or the third user account 506 may take the form of various other types of accounts. For example, the accounts 502, 504, and/506 may take the form of an online multimedia account, an email account, a social media account, a music playlist account, a podcast account, a video services account, and/or other types of accounts with access to data streams and/or data feeds. As such, the data 106-116 from the data streams 102, 104, 202, 204, and/or 206 may include a digital advertisement and/or an advertisement stream, a social networking data, curated data, a music playlist, a podcast playlist, a video list, and/or other sources or platforms of online multimedia.

Figure 6:
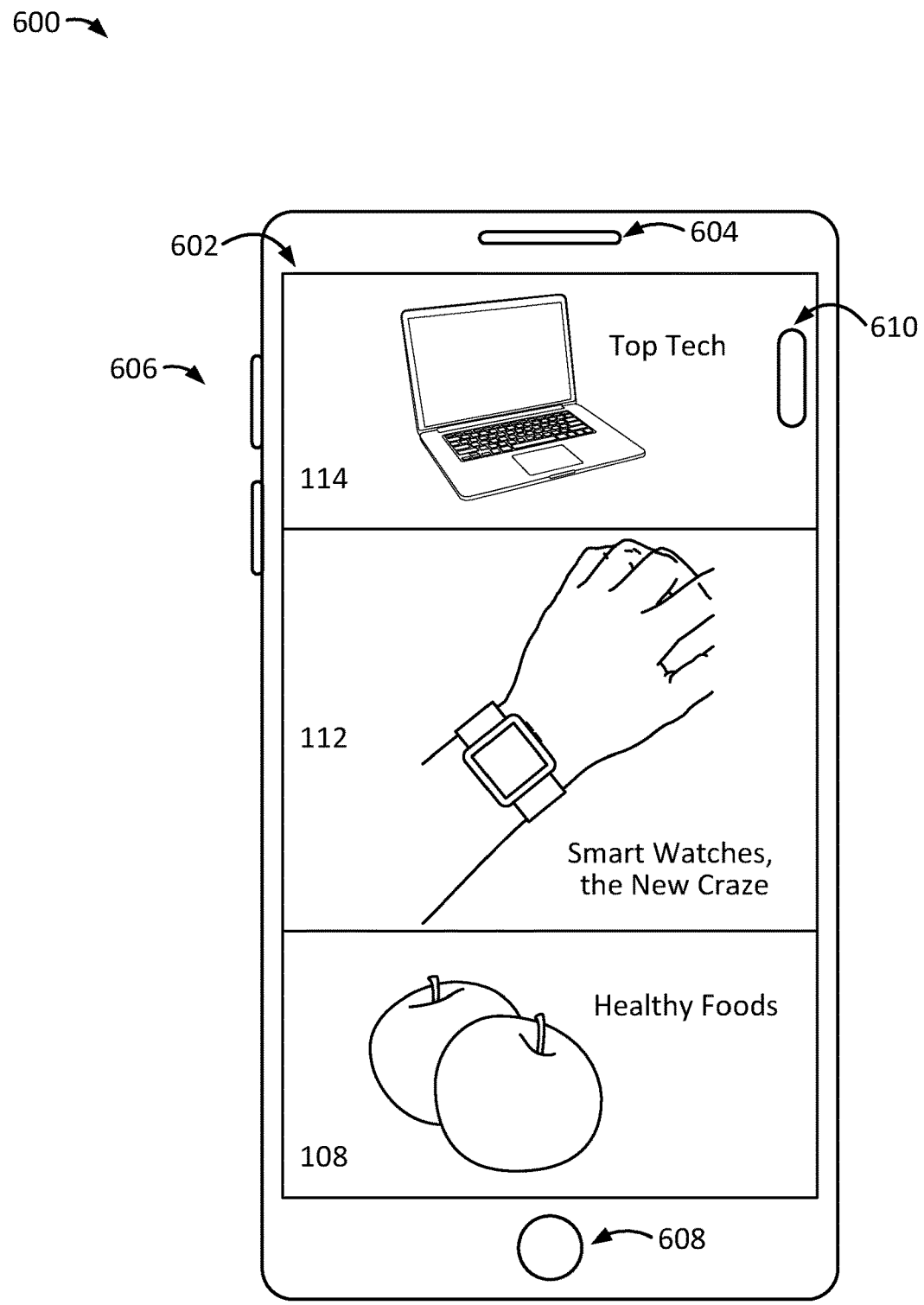
FIG. 6 illustrates a mobile device, according to an embodiment.

FIG. 6 illustrates a mobile device 600, according to an embodiment. As shown, the mobile device 600 may take the form of the first user device described in the scenarios above. Further, the mobile device 600 may include a display 602, possibly also referred to herein as the input/output (I/O) interface 602. Yet further, the mobile device 600 may include a speaker 604, buttons 606 and/or 608, and a scrolling input 610. As such, by moving the scrolling input 610 up or down on the display 602 (or potentially horizontally and/or diagonally), various data 114, 112, and/or 108 may be provided on the display 602.

In some embodiments, one or more data feeds 104 and/or 204 may include the first data 112 and second data 114 associated with the request received from the first user. For example, the first data 112 and the second data 114 may include one or more types of data requested by the first user. In some instances, referring back to FIG. 4, the method 400 described above may include ranking the first data 112 and the second data 114 based on the received request from the first user. For example, consider that the request indicates one or more types of data associated with personal laptop computers. In such instances, the second data 114 may be ranked above the first data 112.

Thus, as shown in FIG. 6, for example, the systems described above, such as the systems 100 and/or 220, may cause the first user device 600 to display the first data 112 and the second data 114 based on the ranking of the first data 112 and the second data 114. In particular, the first user device 600 may display the second data 114 above the first data 112, possibly based on second data 114 relating to the request described above to indicate one or more types of data associated with personal laptop computers. Yet, the first user device 600 may display the first data 112 above the third data 108, possibly based on the first data 112 relating closer to the request. In particular, the smart watch shown with the first data 112 may be more closely related to personal computers than the "Healthy Foods" advertisement shown in the third data 108.

It should be noted that ranking the data 114, 112, and/or 108, among other forms of data may be based on links 508-518 and/or 512-516 of the social network graph 500 described above. For example, consider a scenario such that the data 114 is received from the second user account 504 and the data 112 and/or 108 is received from the third user account 506. As such, the data 114 may be ranked above the other data 112 and/or 108 based on the link 508 between the first user account 502 and the second user account 504, possibly where the link 508 is a direct link between the first user account 502 and the second user account 504. Notably, the first user account 502 and the third user account 506 may be linked indirectly through the link 508, the second user account 504, and the link 510, for example.

As noted, a fee may be required by the second user to provide the first user with access to the data 114. For example, referring back to FIG. 4, the method 400 may include determining a fee required by the second user such that the first user may have access to the one or more data feeds 104, 204, and/or 206. Further, the method 400 may include determining a confirmation from the first user to provide the fee to second user. As such, the authorization level from the second user may be determined based on the confirmation from the first user to provide the fee to the second user. Notably, the authorization level may dictate or control the level of access a user may have to the one or more data feeds 104, 204, and/or 206. For example, one authorization level may allow the user to portions of the data feeds 104, 204, and/or 206, and yet, another authorization level may allow the user to more portions of the data feeds 104, 204, and/or 206.

Figure 7:
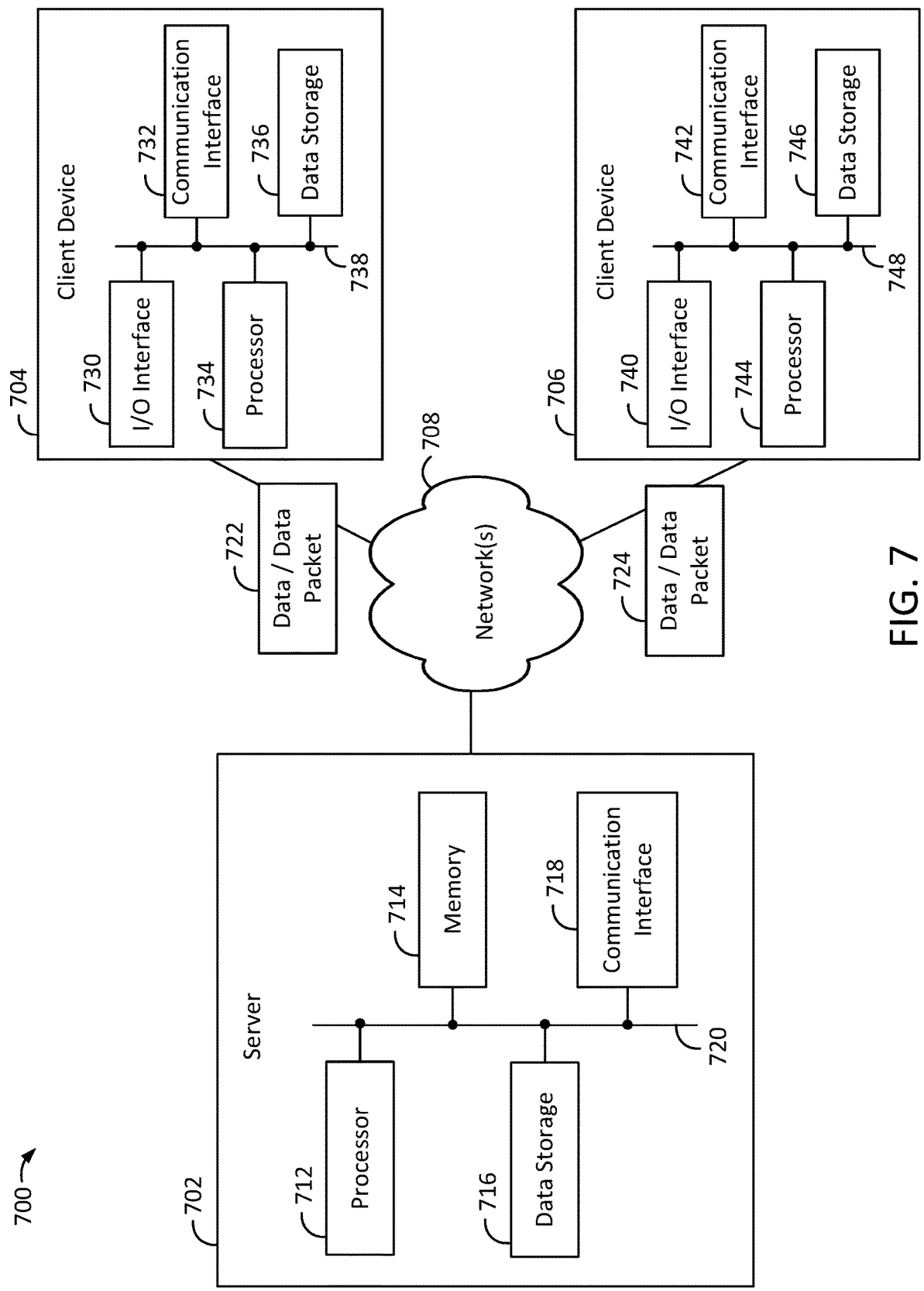
FIG. 7 is a block diagram of an exemplary system, according to an embodiment.

FIG. 7 is a block diagram of an exemplary system 700, according to an embodiment. The system 700, possibly also referred to as the data infrastructure 700, may be configured to transfer data over one or more communication networks 708. In particular, the system 700 may include the server system 702. The server system 702 may be configured to perform operations of one or more service providers, such as PayPal, Inc. of San Jose, Calif., USA. Further, the system 700 may also include a client device 704 and/or a client device 706 operated by their respective users, such as the first user and the second user described above, respectively. In practice, the server system 702 and the client devices 704 and/or 706 may be configured to communicate over the one or more communication networks 708.

The system 700 may operate with more or less than the computing devices shown in FIG. 7A, where each device may be configured to communicate over one or more communication networks 708, possibly to transfer data accordingly. The one or more communication networks 708 may also include a packet-switched network configured to provide digital networking communications, possibly to exchange data of various forms, content, type, and/or structure. The one or more communication networks 708 may include a data network such as a private network, a local area network, and/or a wide area network. In some instances, the one or more communication networks 708 may include a communications network such as a telecommunications network and/or a cellular network with one or more base stations, among other possible networks.

The data/data packets 722 and/or 724 may be transferable using communication protocols such as packet layer protocols, packet ensemble protocols, and/or network layer protocols. For example, the data/data packets 722 and/or 724 may be transferable using transmission control protocols and/or internet protocols (TCP/IP). In various embodiments, each of the data/data packets 722 and 724 may be assembled or disassembled into larger or smaller packets of varying sizes, such as sizes from 7,000 to 7,500 bytes, for example, among other possible sizes. As such, data/data packets 722 and/or 724 may be transferable over the one or more networks 708 and to various locations in the data infrastructure 700.

In some embodiments, the server system 702 may take a variety of forms. The server system 702 may be an enterprise server, possibly configured with one or more operating systems to facilitate the scalability of the data infrastructure 700. For example, the server system 702 may configured with a Unix-based operating system to integrate with a growing number of other servers, client devices 704 and/or 706, and one or more networks 708 based on the architecture of the system 700. The server system 702 may further facilitate workloads associated with numerous data transfers in view of an increasing number of data streams and/or data feeds.

In some embodiments, the server system 702 may include multiple components, such as a hardware processor 712, a non-transitory memory 114, a non-transitory data storage 716, and/or a communication interface component 718, among other possible components, any of which may be communicatively linked via a system bus, network, or other connection mechanism 720. The hardware processor 712 may take the form of a multi-purpose processor, a microprocessor, a special purpose processor, a digital signal processor (DSP) and/or other types of processing components.

For example, the hardware processor 712 may include an application specific integrated circuit (ASIC), a programmable system-on-chip (SOC), and/or a field-programmable gate array (FPGA) to process, read, and/or write data for an increasing number of data streams and/or data feeds for numerous users. In particular, the hardware processor 712 may include a variable-bit (e.g., 64-bit) processor architecture specifically configured to facilitate the scalability of the increasing number of users. As such, the hardware processor 712 may execute varying instructions sets (e.g., simplified and complex instructions sets) with fewer cycles per instruction than other conventional general-purpose processors to improve the performance of the server system 702 for purposes of mass scalability and/or accommodation of growth.

In practice, for example, the hardware processor 712 may be configured to parse the one or more data packets 722. As such, the hardware processor 712 may identify one or more types of data, possibly including particular data entries, transferred with the client device 704. For example, the hardware processor 712 may receive a request 722 from a first user device 704 for one or more types of data, such as data associated with an item, an interest, and/or a topic, as discussed above. In some instances, the received request 722 may identify a second user device 706 associated with the one or more types of data. For example, the received request 722 may include an identifier of the second user device 706, such as a first name and/or a last name, a username associated with an account, an email address, a telephone number, among other types of data associated with the second user device 706. Further, the processor 712 may search one or more data streams 104, 204, and/or 206 associated with the second user based on the request for the one or more types of data. Yet further, the system 200 may identify data 114 from the one or more data streams 104, 204, and/or 206 that corresponds to the one or more types of requested data based on searching the one or more data streams 104, 204, and/or 206. In some embodiments, the processor 712 may determine an authorization from the second user to transfer the identified data 114 from the one or more data streams 104, 204, and/or 206 to the first user device 704, possibly to the first user's data streams 102 and/or 202, described above. Further, the processor 712 may transfer the identified data 114 from the one or more data streams 204 to the first user device 702 based on the authorization from the second user.

In some embodiments, the hardware processor 712 may receive a request from the first user device 704 for one or more types of data. The processor 712 may also search for one or more data feeds 104, 204, and/or 206 described above, possibly associated with one or more other users. Further, the processor 712 may also identify data 112 and/or 114 from the one or more data feeds 104, 204, and/or 206 that corresponds to the one or more types of the requested data based on searching the one or more data feeds 104, 204, and/or 206. The processor 712 may also determine an authorization from the one or more other users to transfer 208 and/or 212 the identified data 114 and/or 112 from the one or more data feeds 204 and/or 206 to the user device. The processor 712 may also cause the first user device 704 to display the identified data 114 and/or 112 from the one or more data feeds 204 and/or 206 based on the determined authorization from the one or more other users.

The non-transitory memory component 714 and/or the data storage 716 may include one or more volatile, non-volatile, and/or replaceable data storage components, such as a magnetic, optical, and/or flash storage that may be integrated in whole or in part with the hardware processor 712. In one example, the memory component 714 may include a number of instructions and/or instruction sets. The processing component 712 may be coupled to the memory component 714 and configured to read the instructions to cause the server system 702 to perform operations, such as those described in this disclosure, illustrated by the accompanying figures, and/or otherwise contemplated herein. Notably, the data storage 716 may be configured to store numerous data entries for the data streams 102, 104, and/or 202-206, possibly including entries that may be shared by the client devices 704 and/or 706 with additional devices.

The communication interface component 718 may take a variety of forms and may be configured to allow the server system 702 to communicate with one or more devices, such as the client devices 704 and/or 706. For example, the communication interface component 718 may include a transceiver that enables the server system 702 to communicate with the client devices 704 and/or 706 via the one or more communication networks 708. Further, the communication interface component 718 may include a wired interface, such as an Ethernet interface, to communicate with the client devices 704 and/or 706. Yet further, the communication interface component 718 may include a wireless interface, such as a cellular interface, a Global System for Mobile Communications (GSM) interface, a Code Division Multiple Access (CDMA) interface, and/or a Time Division Multiple Access (TDMA) interface, among other possibilities. In addition, the communication interface 718 may include a wireless local area network interface such as a WI-FI interface configured to communicate with a number of different protocols. As such, the communication interface 718 may include a wireless interface configured to transfer data over short distances utilizing short-wavelength radio waves in approximately the 2.4 to 2.485 GHz range. In some instances, the communication interface 718 may send/receive data or data packets 722 and/or 724 to/from client devices 704 and/or 706.

The client devices 704 and 706 may also be configured to perform a variety of operations such as those described in this disclosure, illustrated by the accompanying figures, and/or otherwise contemplated herein. For example, the client devices 704 and 706 may be configured to transfer data packets 722 and/or 724 with the server system 702, respectively, such that the server system 702 may manage data transfers 208, 210, and/or 212 with the client device 704 and/or 706. The server system 702 may also parse the data packets 722 and/or 724 including image data, multimedia data, video data, gaming data, location data, such as Global Positioning System (GPS) data and/or GPS coordinate data, triangulation data, beacon data, WI-FI data, peer data, social media data, sensor data, movement data, temperature data, and/or other types of data described or contemplated herein.

In some embodiments, the client devices 704 and 706 may include or take the form of a smartphone system, a personal computer (PC) such as a laptop device, a tablet computer device, a wearable computer device, a head-mountable display (HMD) device, a smart watch device, and/or other types of computing devices configured to transfer data. The client devices 704 and 706 may include various components, including, for example, input/output (I/O) interfaces 730 and 740, communication interfaces 732 and 742, hardware processors 734 and 744, and non-transitory data storages 736 and 746, respectively, all of which may be communicatively linked with each other via a system bus, network, or other connection mechanisms 738 and 748, respectively.

The I/O interfaces 730 and 740 may be configured to receive inputs from and provide outputs to respective users of the client devices 704 and 706. For example, the I/O interface 730 may include a display that provides a graphical user interface (GUI) configured to receive an input from a user to create, configure, and/or modify one or more data streams 102, 104, and/or 204-206. Thus, the I/O interfaces 730 and 740 may include displays configured to receive inputs and/or other input hardware with tangible surfaces, such as touchscreens with touch sensitive sensors and/or proximity sensors. The I/O interfaces 730 and 740 may also include a microphone configured to receive voice commands, a computer mouse, a keyboard, and/or other hardware to facilitate input mechanisms. In addition, I/O interfaces 730 and 740 may include output hardware such as one or more sound speakers, other audio output mechanisms, haptic feedback systems, and/or other hardware components.

In some embodiments, communication interfaces 732 and 742 may include or take a variety of forms. For example, communication interfaces 732 and 742 may be configured to allow client devices 704 and 706, respectively, to communicate with one or more devices according to a number of protocols described and/or contemplated herein. For instance, communication interfaces 732 and 742 may be configured to allow client devices 704 and 706, respectively, to communicate with the server system 702 via the one or more communication networks 708. The hardware processors 734 and 744 may include one or more multi-purpose processors, microprocessors, special purpose processors, digital signal processors (DSP), application specific integrated circuits (ASIC), programmable system-on-chips (SOC), field-programmable gate arrays (FPGA), and/or other types of processing components.

The non-transitory data storages 736 and 746 may include one or more volatile or non-volatile data storages, removable or non-removable data storages, and/or a combination of such data storages that may be integrated in whole or in part with the hardware processors 734 and 744, respectively. Further, data storages 736 and 746 may include non-transitory memories that store instructions and/or instructions sets. Yet further, the hardware processors 734 and 744 may be coupled to the data storages 736 and 746, respectively, and configured to read the instructions from the non-transitory memories to cause the client devices 704 and 706 to perform operations, respectively, such as those described in this disclosure, illustrated by the accompanying figures, and/or otherwise contemplated herein.

Figure 8:
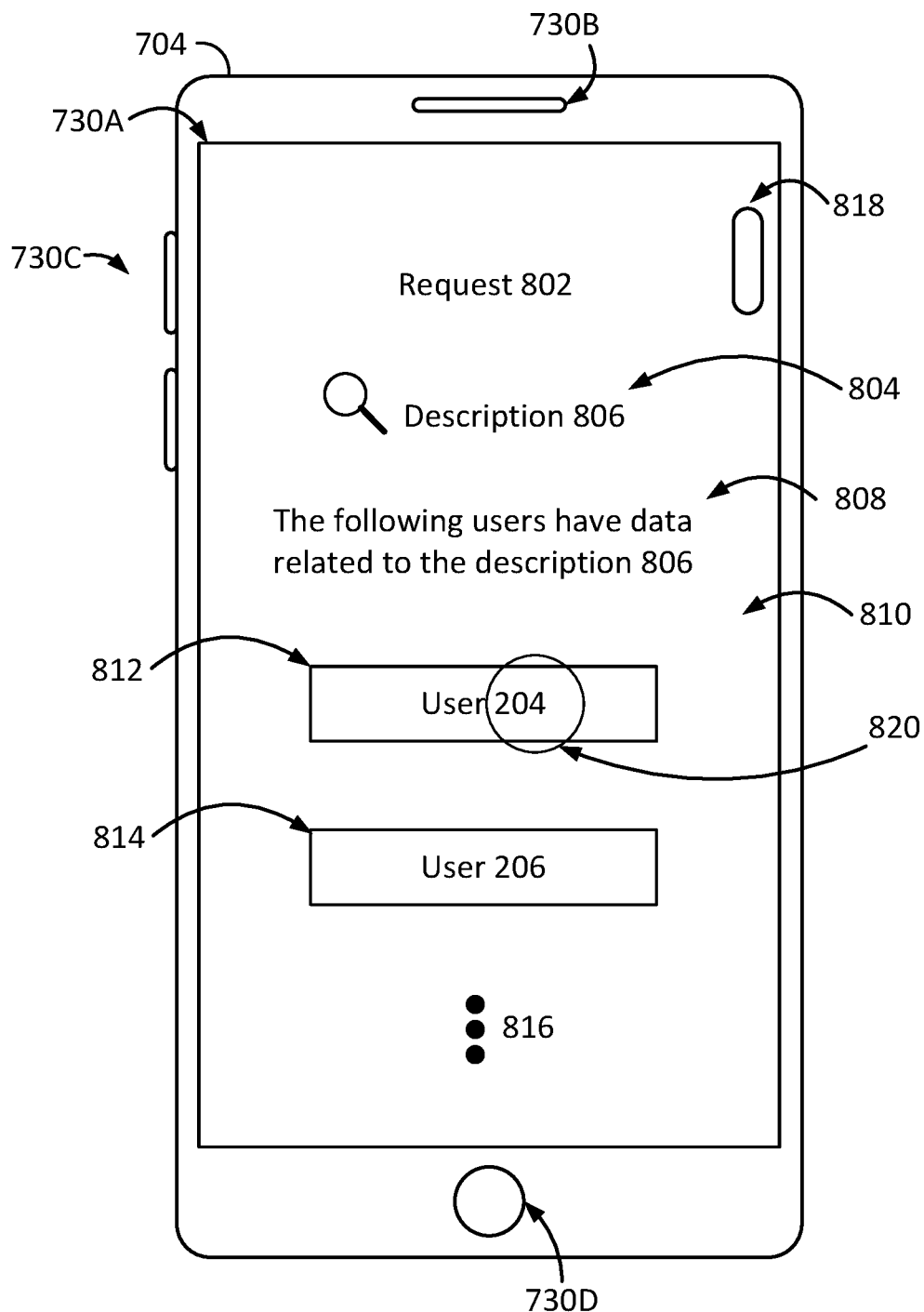
FIG. 8 illustrates a first user device, according to an embodiment.

FIG. 8 illustrates a first user device 704, according to an embodiment. As shown, the first user device 704 may take the form of the client device 704 described above in relation to FIG. 7. For example, the first user device 704 includes the I/O interface 730 with a display 730A, a speaker 730B, side buttons 730C, and a fingerprint sensor 730D. As shown, the first user device 704 displays a request 802 with a search 804, where a description 806 is entered for the search 804, possibly including a description of an item, an interest, and/or any type of data and/or information sought, such as a description for electronics, laptops, and/or smart watches as contemplated above.

Further, the first user device 704 displays a notification 808 that includes, "The following users have data related to the description 806." Yet further, the first user device 704 may display a touch-sense button 812 identifying the second user and a touch-sense button 814 identifying the third user, where the ellipses 816 may identify one or more other users. Notably, the second user, the third user, and/or other users may be listed in accordance of the ranking 810, where the ranking 810 may be based on the links 508, 510, 512, 514, 516, and/or 518 of the first user account 502, the second user account 504, and/or the third user account 506 in the social network graph 500 described above. As such, the first user may make a selection 820 of the button 812 to obtain access to the data 114 described above, possibly by transferring a fee to the second user in exchange for the data 114.

Figure 9:
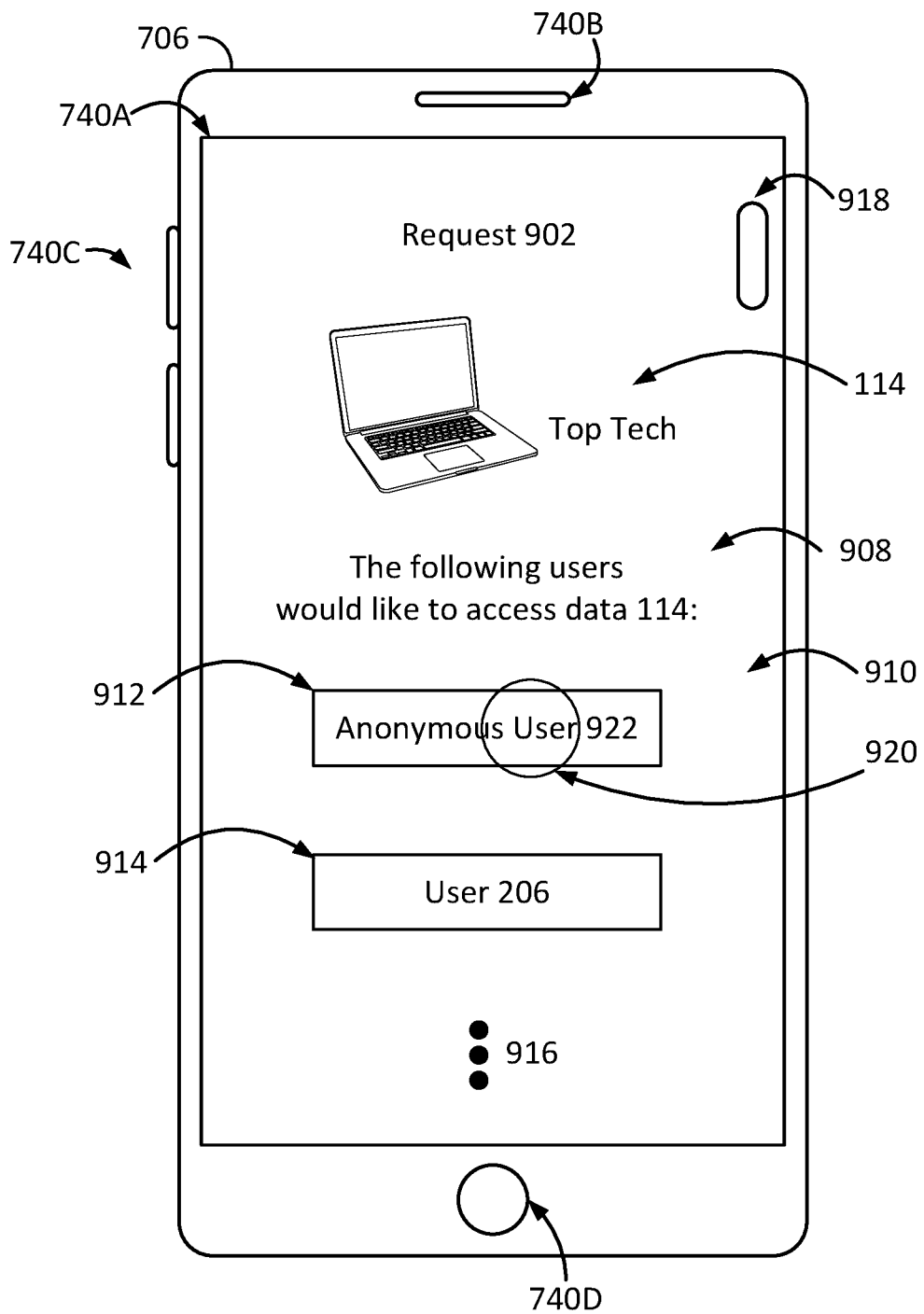
FIG. 9 illustrates a second user device, according to an embodiment.

FIG. 9 illustrates the second user device 706, according to an embodiment. As shown, the second user device 706 may take the form of the client device 706 described above in relation to FIG. 7. For example, the second user device 706 includes the I/O interface 740 described above with a display 740A, a speaker 740B, side buttons 740C, and a fingerprint sensor 740D. As shown, the second user device 706 displays a request 902 with the data 114 that corresponds to the description 806 entered for the search 804 described above, possibly including the description for electronics, laptops, and/or smart watches as contemplated above.

Further, the second user device 706 displays a notification 908 that includes, "The following users would like access to data 114." Yet, as discussed above, the first user may wish to view the data streams 104 and/or 204 associated with the second user. As such, the second user device 706 may display a touch-sense button 912 identifying an anonymous user 922, possibly representative of the first user, and a touch-sense button 914 identifying the third user, where the ellipses 916 may identify one or more other users. Notably, the anonymous user 922, possibly representing the first user in one scenario, the third user, and/or other users may be listed in accordance of the ranking 910, where the ranking 910 may be based on the links 508, 510, 512, 514, 516, and/or 518 of the first user account 502, the second user account 504, and/or the third user account 506 in the social network graph 500 described above. As such, the second user may make a selection 920 of the first user to provide the first user with access to the data 114 described above, possibly based on the second user 204 receiving the fee from the first user in exchange for the data 114.

The present disclosure, the accompanying figures, and the claims are not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the first user may unsubscribe from the data stream 204 of the second user, the second user may block a third user completely, and a fourth user may forward/share the data stream from the fifth user to a sixth user friend. Having thus described embodiments of the present disclosure, persons of ordinary skill in the art will recognize that changes may be made in form and detail without departing from the scope of the present disclosure.

What is claimed is:

1. A system, comprising:
a non-transitory memory; and
one or more hardware processors coupled to the non-transitory memory and configured to read instructions from the non-transitory memory to cause the system to perform operations comprising:
providing a first data stream to a computing device of a first user based on a setting of a first user account associated with the first user;
receiving, from the first user, a data request for data corresponding to a particular data type;
determining, among a plurality of data streams, a second data stream having the data corresponding to the particular data type based on a trusted relationship between the first user account and a second user account of a second user associated with the second data stream;
determining a number of connections between the first user account and the second user account within an online social network;
selecting, among different portions of the second data stream corresponding to the particular data type, a particular portion of the second data stream based on the number of connections;
inserting the particular portion of the second data stream into the first data stream to generate a modified first data stream; and
providing the first user access to the modified first data stream.

2. The system of claim 1, wherein the operations further comprise determining that the number of connections between the first user account and the second user account within the online social network exceeds a threshold number, and wherein the particular portion is selected from the different portions of the second data stream further based on the determining that the number of connections between the first user account and the second user account exceeds the threshold number.

3. The system of claim 1, wherein the operations further comprise limiting the first user access to data having a first characteristic in the second data stream based on the number of connections between the first user account and the second user account, and wherein the particular portion of the second data stream is selected from the different portions to exclude the data having the first characteristic.

4. The system of claim 1, wherein the determining the number of connections between the first user account and the second user account comprises determining whether the first user account is directly or indirectly connected to the second user account within the online social network.

5. The system of claim 4, wherein the particular portion of the second data stream comprises a larger portion when the first user account is determined to be directly connected to the second user account, and wherein the particular portion of the second data stream comprises a smaller portion when the first user account is determined to be indirectly connected to the second user account.

6. The system of claim 1, wherein the particular portion of the second data stream is inserted into the first data stream according to a first arrangement, and wherein the particular portion is included in the second data stream according to a second arrangement different from the first arrangement.

7. The system of claim 1, wherein the online social network includes the system.

8. The system of claim 1, wherein the operations further comprise:
receiving, from the computing device, authentication information associated with the first user account; and
in response to receiving the authentication information, providing, on the computing device, an interface that presents the modified first data stream.

9. A method comprising:
providing, by one or more hardware processors, a first data stream to a computing device of a first user based on a setting of a first user account associated with the first user;
receiving, by the one or more hardware processors from the first user, a request for data not included in the first data stream;
identifying, by the one or more hardware processors from a plurality of user accounts with a social networking website, a second data stream having the data associated with the request based on a trusted relationship between the first user account and a second user account of a second user associated with the second data stream;
determining, by the one or more hardware processors, a number of connections between the first user account and the second user account within the social networking website;
selecting, by the one or more hardware processors among different portions of the second data stream corresponding to different data types, a particular portion of the second data stream corresponding to a particular data type based on the number of connections;
modifying, by the one or more hardware processors, the first data stream by inserting the particular portion of the second data stream corresponding to the particular data type into the first data stream; and
providing, by the one or more hardware processors, the first user account access to the modified first data stream.

10. The method of claim 9, wherein the determining the number of connections between the first user account and the second user account comprises:
- accessing a social network graph representing connections among the plurality of user accounts; and
- determining the number of connections based on a number of user accounts along a connection path between the first user account and the second user account and that separate the first user account and the second user account within the social network graph.

11. The method of claim 9, wherein the determining the number of connections between the first user account and the second user account comprises:
- accessing a social network graph representing connections among the plurality of user accounts; and
- determining a number of different routes that connect the first user account to the second user account within the social network graph.

12. The method of claim 9, further comprising:
- receiving, from the computing device, authentication information associated with the first user account; and
- in response to receiving the authentication information, providing, on the computing device, an interface that presents the modified first data stream.

13. The method of claim 9, wherein the modifying the first data stream comprises formatting the modified first data stream including the particular portion of the second data stream according to a first data format based on first user preferences specified by the first user account.

14. A non-transitory machine-readable medium having stored thereon machine-readable instructions executable to cause a machine to perform operations comprising:
- providing first content to a computing device associated with a first user based on a setting of a first user account associated with the first user;
- receiving, from the computing device, a request for data;
- determining, among a plurality of content associated with different user accounts, second content having the data associated with the request based on a trusted relationship between the first user account and a second user account of a second user associated with the second content;
- determining a number of connections between the first user account and the second user account within an online social network;
- selecting, from different portions of the data in the second content corresponding to different data types, a particular portion of the second content corresponding to a particular data type based on the number of connections;
- modifying the first content by inserting the particular portion of the second content corresponding to the particular data type into the first content; and
- providing the first user access to the modified first content.

15. The non-transitory machine-readable medium of claim 14, wherein the first content comprises first data obtained from a first set of data sources, and wherein the second content comprises second data obtained from a second set of data sources not included in the first set of data sources.

16. The non-transitory machine-readable medium of claim 14, wherein the operations further comprise determining that the number of connections between the first user account and the second user account within the online social network exceeds a threshold number, and wherein the particular portion is selected from the different portions of the second content further based on the determining that the number of connections between the first user account and the second user account exceeds the threshold number.

17. The non-transitory machine-readable medium of claim 14, wherein the operations further comprise limiting the first user access to data having a first characteristic in the second content based on the number of connections between the first user account and the second user account, and wherein the particular portion of the second content is selected from the different portions to exclude the data having the first characteristic.

18. The non-transitory machine-readable medium of claim 14, wherein the determining the number of connections between the first user account and the second user account comprises determining whether the first user account is directly or indirectly connected to the second user account within the online social network.

19. The non-transitory machine-readable medium of claim 18, wherein the particular portion comprises a larger portion of the second content when the first user account is determined to be directly connected to the second user account, and wherein the particular portion comprises a smaller portion of the second content when the first user account is determined to be indirectly connected to the second user account.

20. The non-transitory machine-readable medium of claim 14, wherein the operations further comprise:
- receiving, from the computing device, authentication information associated with the first user account; and
- in response to receiving the authentication information, providing, on the computing device, an interface that presents the modified first content.

* * * * *